United States Patent
Hansson

(10) Patent No.: US 7,698,969 B2
(45) Date of Patent: Apr. 20, 2010

(54) NUT RUNNER MOUNTING STRUCTURE

(75) Inventor: Gunnar Christer Hansson, Stockholm (SE)

(73) Assignee: Atlas Copco Tools AB, Nacka (SE)

( * ) Notice: Subject to any disclaimer, the term of this patent is extended or adjusted under 35 U.S.C. 154(b) by 226 days.

(21) Appl. No.: 11/664,365

(22) PCT Filed: Sep. 29, 2005

(86) PCT No.: PCT/SE2005/001432

§ 371 (c)(1),
(2), (4) Date: Aug. 31, 2007

(87) PCT Pub. No.: WO2006/038856

PCT Pub. Date: Apr. 13, 2006

(65) Prior Publication Data

US 2008/0121403 A1 May 29, 2008

(30) Foreign Application Priority Data

Oct. 1, 2004 (SE) .................................... 0402376

(51) Int. Cl.
*B25B 21/00* (2006.01)
*B25H 1/00* (2006.01)
(52) U.S. Cl. ...................................... 81/57.4; 81/57.22
(58) Field of Classification Search ................ 81/57.14, 81/57.22, 57.3, 57.32, 57.4; 248/317; 173/178
See application file for complete search history.

(56) References Cited

U.S. PATENT DOCUMENTS

| 2,651,228 | A | * | 9/1953 | Taylor ........................ 81/57.36 |
| 2,964,152 | A | * | 12/1960 | Banner ..................... 192/56.32 |
| 3,322,205 | A | | 5/1967 | Amtsberg et al. |
| 3,333,613 | A | * | 8/1967 | Bosse .......................... 81/57.4 |
| 3,686,983 | A | * | 8/1972 | Flagge ......................... 81/429 |
| 4,765,210 | A | | 8/1988 | Mierbach et al. |
| 6,189,418 | B1 | * | 2/2001 | Sloan et al. ................ 81/57.36 |
| 7,055,408 | B2 | * | 6/2006 | Sasaki ........................... 81/54 |

FOREIGN PATENT DOCUMENTS

EP  0 544 102 A1  6/1993

* cited by examiner

*Primary Examiner*—David B Thomas
(74) *Attorney, Agent, or Firm*—Frishauf, Holtz, Goodman & Chick, P.C.

(57) ABSTRACT

A nut runner mounting structure for supporting one or more nut runner spindles includes a spindle supporting base plate, and at least one support pillar extending in parallel with the spindles and secured at its forward end to the base plate and at its rear end to a mounting structure support. Each support pillar has a tube element provided with a forward end piece and a rear end piece, and a tension bolt engaging the rear end piece and the base plate to exert an axial clamping force on the tube element. The forward end piece is formed with sharp edged teeth for penetrating into and forming matching teeth in the tube element and the base plate for locking the tube element against rotation. Clamping units are attachable to the tube elements for carrying additional equipment and connecting the structure to a mounting structure support.

20 Claims, 2 Drawing Sheets

NUT RUNNER MOUNTING STRUCTURE

This application is a U.S. National Phase Application under 35 USC 371 of International Application PCT/SE2005/001432 filed Sep. 29, 2005.

The invention relates to a mounting structure for one or more nut runner spindles and comprises a forward base plate rigidly secured to the nut runner spindle or spindles, one or more rearwardly extending support pillars connected at their forward ends to the base plate and at their rear ends to a mounting structure support means.

Previous types of mounting structures for nut runner spindles are disadvantageous in that they are unnecessary heavy and still not rigid enough to withstand reaction torque related forces without yielding and being deformed. The mounting structures for this purpose usually includes a forward base plate for carrying the nut runner spindles, and one or more support pillars extending rearwardly from the base plate, wherein in some cases the support pillars are formed by tubes which are threaded into the base plate. In other cases the support pillars are formed by extruded aluminum profiles secured to the base plate by screws threaded into the profile ends.

The threaded connections between the support pillars and the base plate have proved not to be rigid and strong enough to prevent the pillars from being somewhat rotated at heavy torque loads, thereby spoiling the rigidity of the structure and failing to balance reaction torque from the nut runner spindles.

The main object of the invention is to create a mounting structure for nut runner spindles which is relatively light and able to withstand heavy torque loads without being deformed.

Further objects and advantages of the invention will appear from the following specification and claims.

A preferred embodiment of the invention is described below in further detail with reference to the accompanying drawing.

In the drawing

Figure 1:
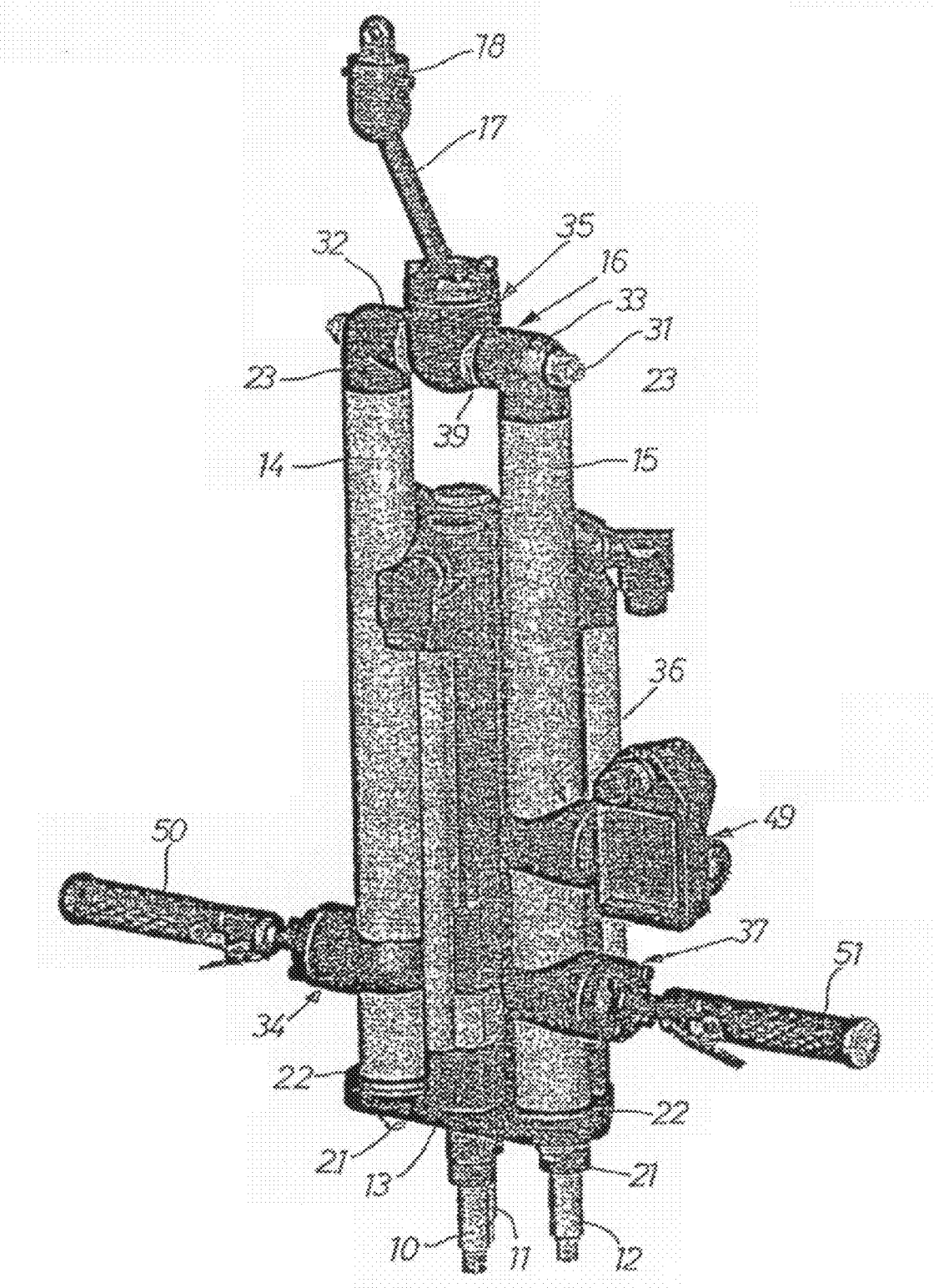
FIG. 1 shows a perspective view of a mounting structure according to the invention.

The nut runner mounting structure illustrated in the drawing is adapted to carry three nut runner spindles 10,11,12 arranged in a pattern determined by a hole pattern in a base plate 13. The spindles are rigidly secured to the base plate 13 in a pattern which is dictated by the relative locations of the screw joints to be tightened by the spindles. The spindles are of a conventional design and do not form any part of the invention. However, each spindle comprises a cylindrical housing with a power supply connection, a motor, and an output shaft formed with square end for connection of a nut socket.

The mounting structure comprises two support pillars 14,15 which extend in parallel with the nut runner spindles and which are rigidly secured by their forward ends to the base plate 13. At their rear ends the support pillars 14,15 are rigidly secured to a yoke 16 which is connected to an overhead support means 18 via a connection rod 17.

Figure 2:
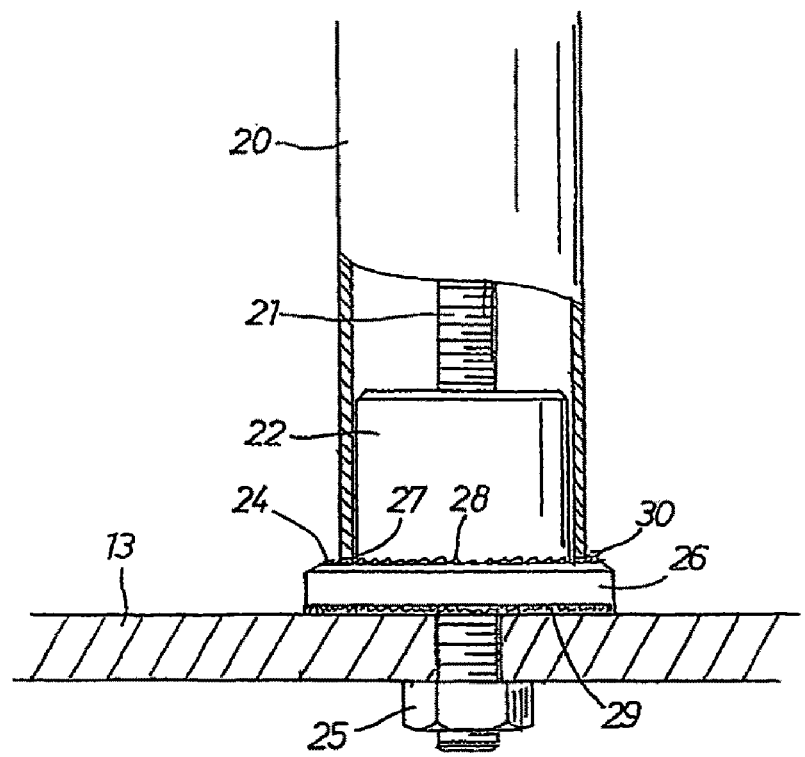
FIG. 2 shows on a larger scale an end piece arrangement for the support pillar tube elements.
Figure 3:
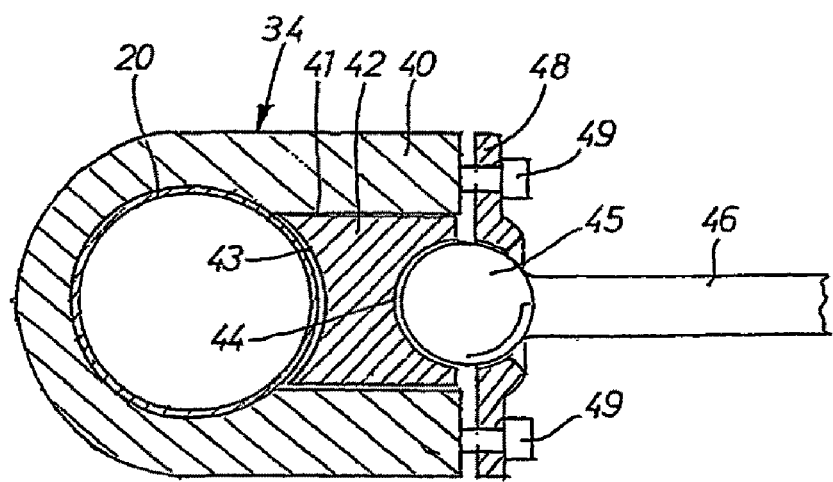
FIG. 3 shows on a larger scale a clamping unit for securing additional equipment to the support pillar tube elements.

Each one of the support pillars 14,15 comprises a tube element 20, a tension bolt 21 extending throughout the entire length of the tube element 20, and a first end piece 22 located between the forward end of the tube element 20 and the base plate 13, and a second end piece 23 located at the rear end of the tube element 20. The tension bolt 21 engages the rear end piece 23 by a thread connection, and extends through the base plate 13 and carries a nut 25 for axial compression of the tube element 13. Thereby, the tube element 13 is clamped against the base plate 13 via the forward end piece 22. See FIG. 2.

The forward end piece 22 comprises a radial flange 26 with an annular surface 24 for engagement with the forward end surface 27 of the tube element 20, and in order to prevent the tube element 20 from any rotational movement relative to the end plate 13 the flange 26 is formed with very fine teeth 28 to engage the forward surface 27 of the tube element 20. The flange 26 is also provided with very fine teeth 29 on its underside for engagement with the base plate 13. The end piece 22 is formed of hardened steel, whereas the tube 20 and the base plate 13 consist of plain unhardened steel, and since the teeth 28, 29 are formed with sharp edges the teeth 28 and 29 will penetrate into the end surface 27 of the tube element 20 and into the base plate 13, respectively, as a heavy tension force is applied by the tension bolt 21. Thereby, the teeth 28 form matching teeth 30 in the tube element 20 and in the base plate 13, which will lock the tube element 20 against rotation relative to the base plate 13. The tension force of the tension bolt 21 results in an axial clamping load on the tube element 20 such that the latter is firmly clamped against the base plate 13 via the forward end piece 22 and the teeth 30 are formed in the tube element 20.

Because of its substantial length the tension bolt 21 provides a certain elasticity, which means that the clamping load on the tube element 20 will be maintained should there be some setting between the tube element 20 and the base plate 13. Such setting is quite possible because of the rather heavy reaction torque related forces being transferred to the base plate 13 also including some bending forces, but because of the elasticity of the tension bolt 13 the clamping action between the tube element 20 and the base plate 13 will always be maintained.

At their rear ends the support pillars 14,15 are connected to the yoke 16 which serves as stabilizing element keeping the pillars 14,15 firmly together. Also the yoke 16 is formed by a tube element 39 of the same diameter as the support pillar tube elements 20 provided with end pieces 32,33, and a tension bolt 31 extends through the yoke to apply a clamping force on the end pieces 32,33 to keep the yoke 16 together as a rigid unit.

The nut runner mounting structure according to the invention also includes one or more clamping units 34-37 by which additional equipments are connectable to the tube elements 20 and the yoke 16. Each one of these clamping units 34-37 comprises a sleeve member 40 arranged to fit snugly on the tube elements 20. The sleeve member 40 has a radial bore 41 in which is movably guided a plunge 42. The plunge 42 is formed on one side with a part-cylindrical concave surface 43 of the same radius as the tube elements 20 and on the opposite side with a spherical concave surface 44 for co-operation with a spherical end portion 45 of a support arm 46. An annular lock element 48 is clamped to the sleeve member 40 by screws 49, thereby frictionally locking the spherical end portion 45 against the plunge 42 and hence the plunge 42 and the sleeve member 40 against the tube element 20. When tighten the screws 49 there is accomplished a firm connection between the sleeve member 40 and the tube element 20 as well as between the plunge 42 and the support arm 46. This means that a fully rigid connection unit is obtained and the support arm 46 can be used for attaching handles 50,51 and a display unit 49 to the support pillars 14,15 and to act as a connecting rod 17 for connection of the mounting structure to an overhead support means.

By forming the clamping units 34-37 as a closed sleeve member 40 snugly fitting on the tube element 20 and by using a plunge 42 with a cylindrical concave contact surface 43 the clamping action relative to the tube elements 20 will be lenient to the tube element 20. This makes it possible to form the tube elements 20 with relatively thin walls and, thereby, get a favourable reduction in weight of the entire mounting structure.

The mounting structure according to the invention is not only relatively light but forms a very rigid and durable support for the nut runner spindles, As in prior art mounting structures for nut runner spindles this new type of structure is very flexible and can be adapted to a varying number of spindles and comprise a varying number of support pillars. The base plate 13 is always adapted to the actual screw joints to be tightened, which means that the pattern of spindle mounting holes in the base plate 13 is always adapted to the pattern of the screw joints.

The invention claimed is:

1. A nut runner mounting structure for supporting one or more nut runner spindles, comprising:
    a base plate extending perpendicularly to and being rigidly secured to a forward end of the nut runner spindle or spindles; and
    at least one support pillar extending in parallel with the nut runner spindle or spindles and being connected at a forward end thereof to the base plate and at a rear end thereof to a mounting structure support; and wherein:
        each one of said at least one support pillar comprises a tube element having a forward end surface and a rear end surface,
        a first end piece located between said forward end surface and the base plate,
        a second end piece arranged to engage said rear end surface of said tube element, and
        a tension bolt located inside and extending throughout the entire length of said tube element, said tension bolt being arranged to engage said second end piece and the base plate to clamp said tube element axially against the base plate via said first end piece,
    said first end piece is rotationally locked relative to the base plate and comprises an annular surface for engaging said forward end surface of said tube element, and
    said annular surface is formed with teeth for engaging matching teeth on said forward end surface to thereby lock said tube element against rotation relative to the first end piece and to the base plate.

2. The mounting structure according to claim 1, wherein said teeth on said annular surface have sharp edges and are arranged to penetrate into said forward end surface of said tube element to thereby form said matching teeth on said forward end surface as an axial clamping force is applied on said tube element by said tension bolt.

3. The mounting structure according to claim 2, wherein said first end piece is formed with a second set of teeth with sharp edges which are arranged to penetrate into the base plate as an axial clamping force is applied on said tube element by said tension bolt, whereby said first end piece is rotationally locked relative to the base plate.

4. The mounting structure according to claim 2, wherein said one or more support pillars are two or more in number, and a yoke is rigidly connected to the rear ends of said support pillars via said second end pieces by engagement of the tension bolts extending through the tube elements of said support pillars.

5. The mounting structure according to claim 4, wherein said yoke comprises a tube element having a same cross section as that of said support pillar tube elements.

6. The mounting structure according to claim 2, further comprising at least one clamping unit for securing additional equipment to said one or more support pillars, wherein each of said at least one clamping unit comprises:
    a sleeve member snugly fitting on one of said tube elements and having a radial bore,
    a plunge movably guided in said bore and being formed at one end with a part-cylindrical concave surface of the same radius as said tube element, and at an opposite end with a spherical concave surface,
    a support arm formed with a spherical end portion for cooperation with said concave spherical surface of said plunge, and
    a clamping element attached to said sleeve member via a screw joint connection and arranged to apply a clamp force onto said spherical end portion of said support arm so as to press the latter as well as said plunge towards said tube element, thereby rigidly securing by friction said sleeve member relative to said tube element, and securing at the same time said support arm against any movement relative to said sleeve member.

7. The mounting structure according to claim 6, wherein said support arm is formed as a part of a handle for manual control of said one or more nut runner spindles.

8. The mounting structure according to claim 1, wherein said first end piece is formed with a second set of teeth with sharp edges which are arranged to penetrate into the base plate as an axial clamping force is applied on said tube element by said tension bolt, whereby said first end piece is rotationally locked relative to the base plate.

9. The mounting structure according to claim 8, wherein said one or more support pillars are two or more in number, and a yoke is rigidly connected to the rear ends of said support pillars via said second end pieces by engagement of the tension bolts extending through the tube elements of said support pillars.

10. The mounting structure according to claim 9, wherein said yoke comprises a tube element having a same cross section as that of said support pillar tube elements.

11. The mounting structure according to claim 8, further comprising at least one clamping unit for securing additional equipment to said one or more support pillars, wherein each of said at least one clamping unit comprises:
    a sleeve member snugly fitting on one of said tube elements and having a radial bore,
    a plunge movably guided in said bore and being formed at one end with a part-cylindrical concave surface of the same radius as said tube element, and at an opposite end with a spherical concave surface,
    a support arm formed with a spherical end portion for cooperation with said concave spherical surface of said plunge, and
    a clamping element attached to said sleeve member via a screw joint connection and arranged to apply a clamp force onto said spherical end portion of said support arm so as to press the latter as well as said plunge towards said tube element, thereby rigidly securing by friction said sleeve member relative to said tube element, and securing at the same time said support arm against any movement relative to said sleeve member.

12. The mounting structure according to claim 11, wherein said support arm is formed as a part of a handle for manual control of said one or more nut runner spindles.

13. The mounting structure according to claim 1, wherein said one or more support pillars are two or more in number, and a yoke is rigidly connected to the rear ends of said support pillars via said second end pieces by engagement of the tension bolts extending through the tube elements of said support pillars.

14. The mounting structure according to claim 13, wherein said yoke comprises a tube element having a same cross section as that of said support pillar tube elements.

15. The mounting structure according to claim 3, wherein said one or more support pillars are two or more in number, and a yoke is rigidly connected to the rear ends of said support pillars via said second end pieces by engagement of the tension bolts extending through the tube elements of said support pillars.

16. The mounting structure according to claim 15, wherein said yoke comprises a tube element having a same cross section as that of said support pillar tube elements.

17. The mounting structure according to claim 1, further comprising at least one clamping unit for securing additional equipment to said one or more support pillars, wherein each of said at least one clamping unit comprises:
- a sleeve member snugly fitting on one of said tube elements and having a radial bore,
- a plunge movably guided in said bore and being formed at one end with a part-cylindrical concave surface of the same radius as said tube element, and at an opposite end with a spherical concave surface,
- a support arm formed with a spherical end portion for cooperation with said concave spherical surface of said plunge, and
- a clamping element attached to said sleeve member via a screw joint connection and arranged to apply a clamp force onto said spherical end portion of said support arm so as to press the latter as well as said plunge towards said tube element, thereby rigidly securing by friction said sleeve member relative to said tube element, and securing at the same time said support arm against any movement relative to said sleeve member.

18. The mounting structure according to claim 17, wherein said support arm is formed as a part of a handle for manual control of said one or more nut runner spindles.

19. A nut runner mounting structure for supporting one or more nut runner spindles, comprising:
- a base plate extending perpendicularly to and being rigidly secured to a forward end of the nut runner spindle or spindles; and
- at least one support pillar extending in parallel with the nut runner spindle or spindles and being rigidly connected at a forward end thereof to the base plate and at a rear end thereof to a yoke; and wherein:
  - each one of said at least one support pillar comprises a tube element extending between the base plate and the yoke, and
  - a tension bolt located inside and extending throughout the entire length of said tube element, said tension bolt having opposite ends and being arranged to engage at the base plate at the end of the tension bolt, and being arranged to engage said yoke at the other end of said tension bolt, and to exert an axial clamping force on said tube element;
- wherein a forward end piece is located between the forward end of the tube element and the base plate, said forward end piece being rotationally locked relative to the base plate and comprising an annular surface for engaging the forward end of said tube element, said annular surface being formed with teeth for engaging matching teeth on said tube element to thereby lock said tube element against rotation relative to the forward end piece and to the base plate.

20. The mounting structure according to claim 19, wherein said teeth on said annular surface have sharp edges and are arranged to penetrate into the tube element to thereby form said matching teeth on said tube element as a result of said axial clamping force applied on said tube element by said tension bolt.

\* \* \* \* \*